United States Patent

[11] 3,597,620

[72] Inventor William H. Wellman
Boxborough, Mass.

[21] Appl. No. 854,205
[22] Filed Aug. 29, 1969
[45] Patented Aug. 3, 1971
[73] Assignee Emerson Electric Co.
St. Louis, Mo.

[54] PATTERN CORRELATION OPTICAL TRACKER UTILIZING CIRCULAR NUTATIONAL SCANNING
26 Claims, 6 Drawing Figs.

[52] U.S. Cl. .......... 250/203, 250/206, 250/233
[51] Int. Cl. .......... G01j 1/20, G01d 5/36, H01j 39/12
[50] Field of Search .......... 250/203, 206, 233

[56] References Cited

UNITED STATES PATENTS 3,290,506 12/1966 Bertram .......... 250/203

*Primary Examiner*—James W. Lawrence
*Assistant Examiner*—T. N. Grigsby
*Attorneys*—Stanley N. Garber and William R. O'Meara

ABSTRACT: A pattern correlation optical tracker having a rotatable reticle with apertures arranged in a predetermined pattern eccentric with respect to the axis of the rotation of the reticle to effect a circular nutational scanning of a target scene. Circuit means including a photo detector for receiving the light passing through the reticle and converting it to an electric signal or waveform. A waveform corresponding to a selected reference scene is stored in a memory magnetic disc rotating synchronously with the reticle, and the signature waveform of a current scene is continuously correlated with a time-shifted memory reference waveform taken from the memory disc at a location 180° displaced from the recording location thereof to produce a desired correlation-with-nutation signal having modulations and from which orthogonal error signals are derived. Synchronous demodulation of this signal produces the orthogonal elevation and azimuth error signals which can be used to maintain the tracker on the target scene, or to indicate the magnitude and direction of scene displacement. Current and reference scene signal patterns are compared to provide automatic updating of the memory reference scene upon the occurrence of scene changes resulting in decorrelation equal to or greater than a preset threshold magnitude.

William H. Wellman,
Inventor.
Stanley N. Garber,
Attorney.

PATTERN CORRELATION OPTICAL TRACKER UTILIZING CIRCULAR NUTATIONAL SCANNING

BACKGROUND OF THE INVENTION

This invention relates to optical error sensing systems and more particularly to pattern correlation-type sensing systems.

In certain prior art optical error sensing systems, a relatively high level of pattern contrast between the desired target and its background is required, and such a system is often not adequate where the entire scene is of low contrast. Also, two optical channels were needed to provide reference and current scene signals for comparison. Usually, one optical device was used to obtain a reference scene signal and the other to produce a nutated current scene signal for comparison. This type of device often resulted in a two-channel balanced and mutually boresighted construction which was relatively complicated, expensive, and delicate.

Some target tracking systems were undesirably affected by contrast changes such as caused by cloud shadows passing over the scene, or by a simple decoy or camouflage. Also, in some cases special bias circuits were required to avoid offset signals even though the target scene did not change.

SUMMARY OF THE INVENTION

Accordingly, it is a general object of the present invention to provide a novel optical motion sensing system. Another object is to provide an improved error sensing system wherein the above-mentioned undesirable features can be substantially obviated.

Another object is to provide a novel optical error sensing system which does not require high pattern contrast between a target and its background for efficient operation.

Another object is to provide an optical error sensing system responsive to variations of brightness in the target pattern in detecting target scene changes, essentially independent of local changes in luminance within the pattern and of moderate changes in overall illumination.

Still another object is to provide a pattern correlation tracker requiring only a single optical channel.

Another object is to provide a tracker of the above type which automatically updates the reference signal as a function of changes in the scene due to aspect or range.

Another object is to provide a tracker of the correlation type having one optical channel for both reference information and current information.

Another object is to provide an indirect pattern correlation tracker of the above type wherein the scan patterns are symmetrical for a stationary target scene whereby substantially no false error signals occur.

Still another object is to provide an indirect correlation-type tracker wherein the reference and the current scene information signals are obtained through the same optical channel, the reference and current scenes both being nutated. Other objects of the present invention will be apparent from the following.

In accordance with one aspect of the present invention, an error sensing system is provided for producing output signals in accordance with the magnitude and direction of movement of a scene from a reference position, including signal producing means for providing a signal corresponding to a predetermined nutation of the scene, means for storing a signal corresponding to a nutational cycle as a reference signal, and correlator means for correlating a current signal produced by the signal producing means with the reference signal, the correlator means correlating the current signal with a reference signal corresponding to the current signal but time-delayed with respect to the nutational cycle to produce a correlation signal, and means for deriving the output signals from the correlation signal.

DESCRIPTION OF THE PREFERRED EMBODIMENT

Figure 1:
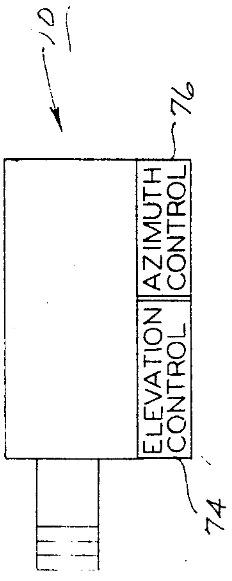
FIG. 1 is a diagrammatic view of a tracker according to the present invention.
Figure 2:
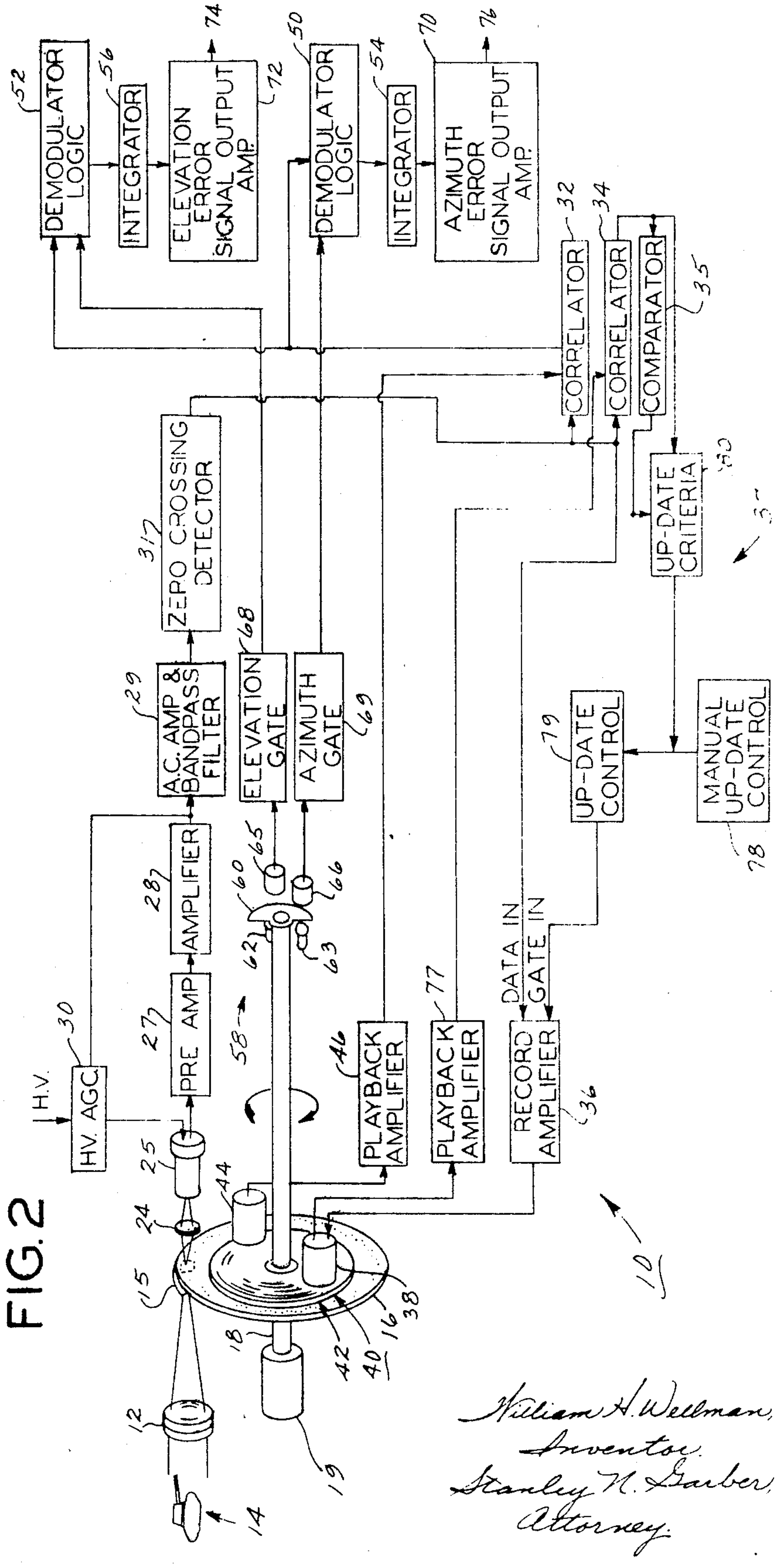
FIG. 2 is a diagrammatic view of the tracker of FIG. 1.

Referring now to the drawings, and more particularly to FIGS. 1 and 2 a correlation-type tracker 10 is shown including a lens assembly 12 for focusing an image of a scene 14 onto a stationary mask or field stop 15 disposed adjacent to a reticle member 16 at the focal plane of the lens assembly. Scene 14 is shown for illustration as including a vehicle, such as a tank, and may include background scenery (not shown).

Figure 3:
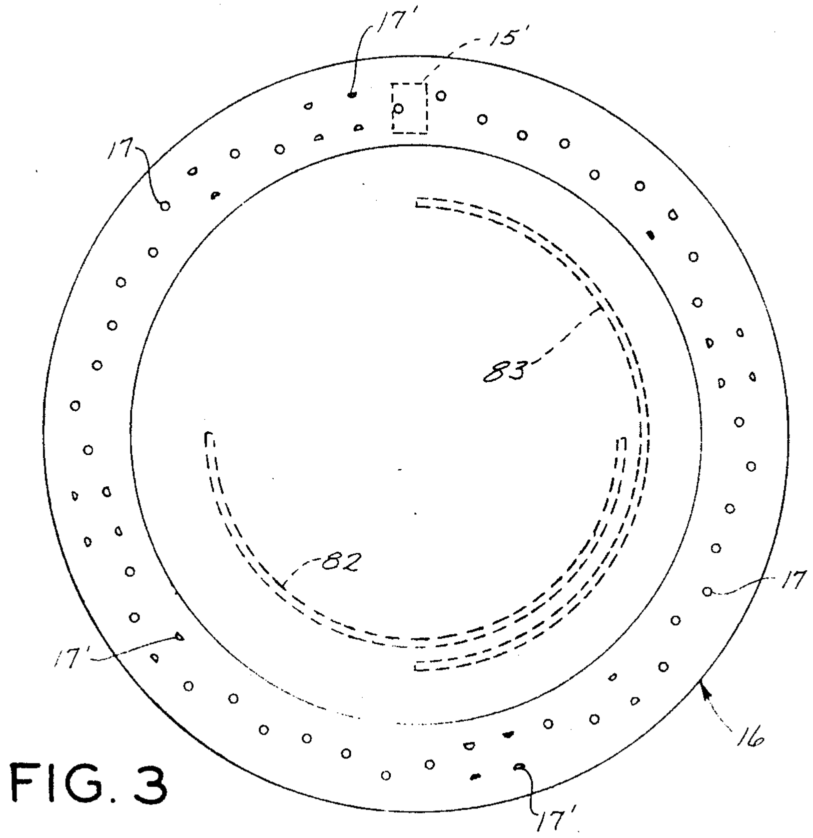
FIG. 3 is a plan view of the reticle of FIG. 1.

The reticle member 16 is shown as a flat disc of suitable opaque material, such as metal, having a plurality of light transmitting elements or apertures 17 disposed around the disc. The disc 16 is connected to a shaft 18 which is driven by an electric motor 19 that may operate, for example, at 6000 r.p.m. In FIG. 3, the reticle disc 16 is shown for illustration as having the equivalent of 48 apertures of equal area distributed around the disc 16, each quadrant having 12. The same pattern of apertures 17 is repeated in the four quadrants to provide even-order symmetry thereof. The apertures 17 are arranged in a semirandom pattern with respect to their radius from pattern center, and are circumferentially spaced from each other such that the equivalent of one full aperture is always within the field of view and the tracker is therefore insensitive to the pattern presented by the field stop 15. In order to scan substantially all of the field of view during a full revolution of disc 16, several "partial" apertures are provided, i.e., two smaller openings which equal one aperture in area.

Figure 4:
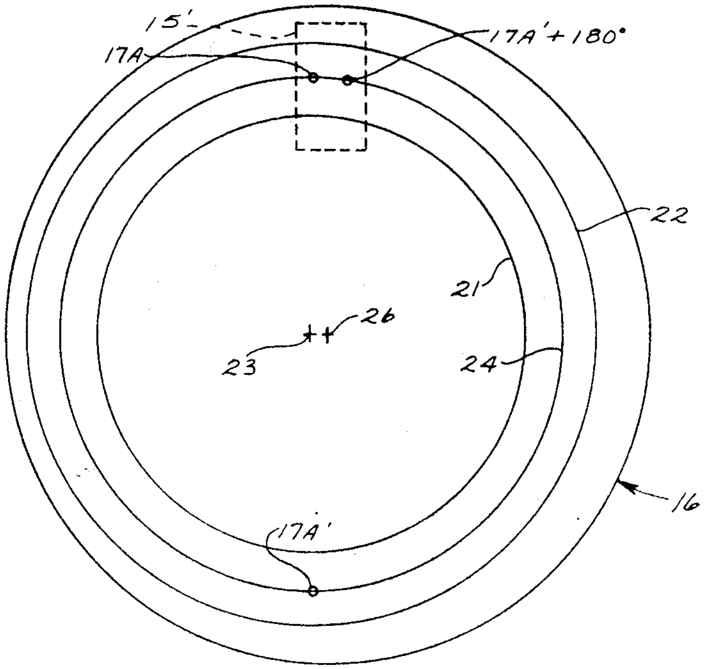
Figure 5:
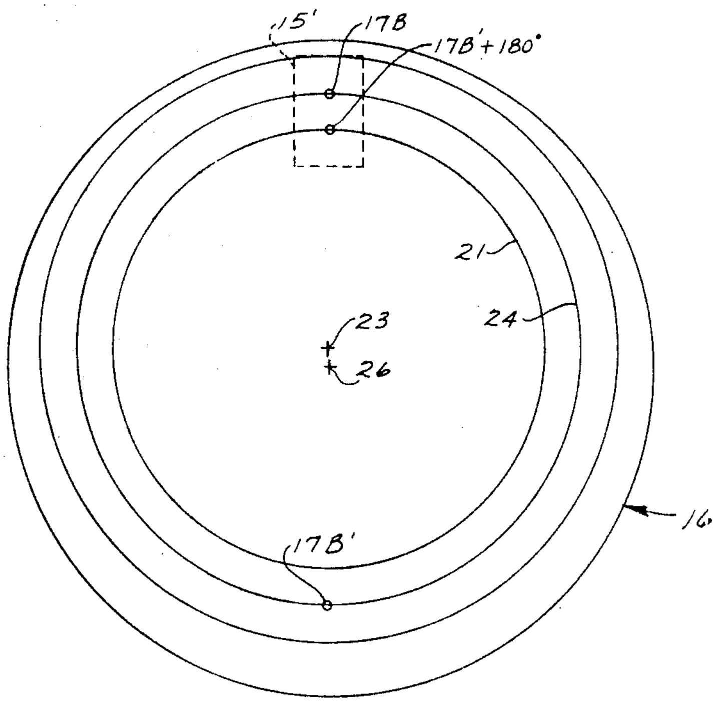

The pattern of apertures 17 is arranged eccentrically with respect to shaft 18 or axis of rotation 26 of the disc 16 to effect an upright circular nutational scanning of the scene, as will be apparent from the exaggerated diagrams shown in FIGS. 4 and 5. The radially inner and outer circles 21 and 22 have their center at 23 and represent the paths of the innermost and outermost reticle apertures, respectively. The circles 21 and 22 define a circular zone between them in which the apertures 17 are disposed. The circle 24 is concentric with circles 21 and 22 and is at the mean radius of the zone of apertures. The geometric center 23 of the aperture patterns is offset from the center of rotation 26 of the reticle disc 16. This offset distance is greatly exaggerated for sake of clarity in the drawings. In practice, this offset distance may be, for example, a fraction of the diameter of an aperture 17. It will be apparent that as the disc 16 rotates about its axis 26, the axis 23 of the pattern of apertures 17 rotates about axis 26. The pattern of apertures is thus circularly nutated to produce an effective upright (scene not rotated) circular nutation of the scene.

This circular nutation of the pattern of apertures is wholly within the total field of view and permits correlation between current and delayed reference scene signals so as to detect the direction and magnitude of movement of a scene or target object within the field of view, as will be more fully explained hereinafter.

A field lens 24 is located to receive radiant energy or light passing through each aperture 17 and to direct the light onto a radiant or light energy responsive device shown as photocell detector or photomultiplier tube 25. The light energy which is passed through the reticle 16 and applied to photocell 25 is a function of the light pattern present in the target scene. The output of photocell 25 is a signal varying in magnitude and frequency with the light intensity and spatial frequency content, respectively, of the scene, the signal having a direct current component related to overall scene radiance. The output of photocell 25 is amplified by a direct coupled preamplifier 27, a direct coupled amplifier 28, and an AC amplifier and band-pass filter 29, all of which may be of conventional design. The usual high voltage source and automatic gain control (AGC) for the photo tube is indicated at 30. The direct current component in the signal at the output of amplifier 28 is employed to control the AGC system, and is blocked from the remainder of the system by the AC amplifier 29.

A zero-crossing detector 31 converts the alternating current signal output of AC amplifier 29 to a signal responsive substantially only to variations in brightness of elements in the scanned scene, and essentially independent of their amplitude. Detector 31 produces a unit voltage output whenever the input signal applied thereto exceeds an arbitrary zero, thereby producing a binary digital pulse train or waveform having a pulse rate and length representing the spatial frequency content of the scanned scene. Zero-crossing detector 31 may be of any suitable conventional design.

The output of the detector 31 is continuously applied to a pair of correlators 32 and 34, which may be well-known "Exclusive-OR" logic circuits, and to a record amplifier 36 which is selectively controlled by a comparator circuit 35 and an update control circuit, indicated generally at 37, as will be fully explained hereinafter.

The record amplifier 36, in response to a predetermined signal from the update circuit 37, energizes a recording head 38 of a memory or recording device indicated generally at 40. The device 40 is shown also including a magnetic disc 42 connected to shaft 18 so that it is rotated in synchronism with the reticle disc 16, and pickup head 44 disposed 180° displaced from the record head 38. Pickup head 44 is adapted to detect the recorded information or signal from magnetic disc 42 and apply the signal to a conventional playback amplifier 46. The output of amplifier 46 is applied to the input of the correlator 32 for comparison with the output of the detector 31. The signal pattern or waveform applied to the record head 38 thus corresponds to a reference scene, and the signal pattern applied to the correlator 32 through amplifier 46 is a signal pattern corresponding to the reference scene, but delayed in time by one-half of a nutation cycle.

Referring again to FIG. 4, aperture 17A, which is within the field stop opening indicated by dashed-line 15, is spaced 180° from an identical aperture 17A'. Since the pattern of apertures is symmetrical about the pattern center 23, but eccentric with respect to the axis 26 of rotation of the reticle 16, an instantaneous signal resulting from light through aperture 17A will be correlated with a delayed reference signal resulting from light through the aperture 17A'(180°*B*). This correlation is indicative of a "look left" nutation necessary for detecting a given azimuthal change in scene pattern. Similarly, FIG. 5 represents a correlation between an instantaneous signal resulting from light through an aperture 17B and a delayed reference signal resulting from light through an aperture 17B' (180°) which is indicative of a "look up" nutation necessary for detecting a given elevational change in scene. While only two instantaneous positions of the reticle 16 are shown in FIGS. 4 and 5 for purposes of illustration, it will be apparent that the offset between centers 23 and 26 produces a circular nutation effect which gives rise to a principal modulation of the signal output of correlator 32 induced by the varying misregistration or displacement effectively introduced between the reference waveform and the current (instantaneous) waveform by the nutation. Synchronous demodulation of the signal output of correlator 32 produces the desired azimuth and elevation error signals.

Figure 6:
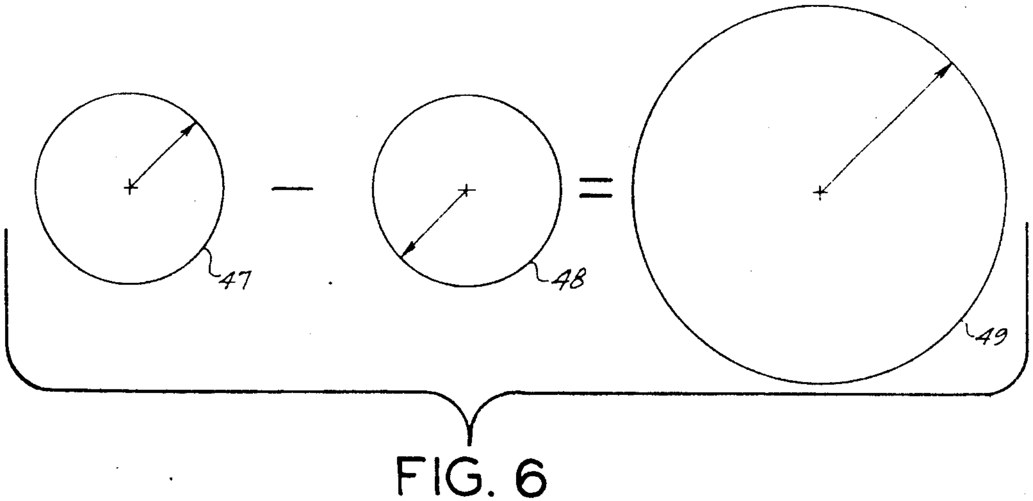
FIGS. 4, 5 and 6 are diagrammatic illustrations for explanatory purposes.

While two optical channels can be used, for example, one for providing a stationary reference scene pattern, and the other providing a nutated current scene pattern for correlation therewith, the illustrated tracker 10 requires only one optical channel. With the tracker 10 both the current and reference scene patterns are effectively nutated using the same optical channel. The position of one pattern with respect to the other is the important consideration in this correlation process. Two equal nutations of the reference and current scenes can be combined to maintain the desired circular nutation. This is accomplished by two half-unit circular nutations, such as represented at 47 and 48 in FIG. 6, which are both in the same direction of rotation and angular rate, but in the opposite phase (pointing direction). The represented nutations 47 and 48 correspond to the nutations of the reference and current scenes respectively, and the relative position between the patterns is represented by the difference between the two rotating vectors expressing the nutations of the two views. This difference, represented at 49 in FIG. 6, reverses the phase (180° shift) of one of the vectors so that the relative displacement between the vectors is given by the sum of two parallel vectors of equal length. This result will hold throughout the nutation cycle giving rise to the desired nutation.

The signal output of detector 31, which is a waveform corresponding to the current scene pattern, is continuously correlated with the delayed reference scene pattern from amplifier 46 by means of the correlator of Exclusive-OR circuit 32. The delayed reference signal or waveform is produced in synchronism with the continuous scene scanning and time phased with the nutation. As is well known, an Exclusive-OR logic, such as circuit 32, produces an output only when there is agreement between the applied signals, i.e., when the signals are simultaneously zero or unit value. The output of circuit 32 is therefore a pulse train or waveform indicative of the correlation between the current and time-delayed reference waveforms. Therefore, the principal modulation of the signal output of correlator 32 generally attains a maximum at the point of least misregistration and a minimum at the point of greatest misregistration, and the modulation fundamentally occurs at a frequency corresponding to the rate of nutation and is related in phase to the phase of the nutation, the phase of the modulations corresponding to the angular components of the relative movement between the scene and the tracker. The amplitude of the modulations correspond to the magnitude of the relative movement between the scene and the tracker. The fundamental information relating to the pointing error in polar coordinates is thus contained in the correlation signal waveform output of correlator 32.

Referring again to FIG. 2, the modulations in the correlation waveform or signal output of circuit 31 are detected and resolved into azimuth and elevation error signals by synchronous demodulation and integration means including a pair of demodulators 50 and 52, and integrator circuits 54 and 56. A demodulator control or gating mechanism 58 is shown which includes a demodulator shutter 60 connected to shaft 18 for concerted rotation with the reticle 16, a pair of radiant energy sources 62 and 63, on one side of the shutter, a pair of photo diodes 65 and 66 on the opposite side of the shutter, and azimuth and elevation gating circuits 68 and 69 connected to the photo diodes. In the illustrated embodiment, the shutter is a semicircular plate and the radiant energy sources 62 and 63 are electric bulbs spaced 90° apart. The photo diodes 65 and 66 are also spaced 90° apart and are adapted to receive light from the bulbs 62 and 63 in accordance with the position of shutter 60. The output of each of the diodes 60 and 61 is a square wave in which the pulses are 180° in duration, i.e., are of a duration of one-half the time of one revolution of reticle 16, the pulses being orthogonally displaced. These gating pulses are applied to elevation and azimuth gating circuits 68 and 69 which control the conduction periods of the demodulator logic circuits 50 and 52 in synchronism with the nutation. The shutter 60, bulbs 62 and 63, and photo diodes 65 and 66 are related and positioned relative to the pattern of apertures 17 such that photo diode 65 for the elevation gate 68 receives light from bulb 62 during that half of the nutational cycle in which the reticle is scanning between the extreme "look-up" position (FIG. 5), and the extreme "look-down" position (180° of rotation), and photo diode 66 for azimuth gate 69 is energized by bulb 63 during that half of the nutation cycle in which the reticle is scanning between the extreme "look left" (FIG. 4), and the extreme "look right" position. The shutter could be positioned such that the edge of the shutter, for example, intersects both centers 23 and 26. With the gating signals for circuits 68 and 69 90° displaced from each other, and in synchronism with reticle 16, the two orthogonal error outputs, elevation and azimuth components of the correlation signal, are derived by the demodulators 50 and 52 and integrating circuits 54 and 56. The output signals of the integrators 54 and 56 are, of course, analog error signals corresponding to the azimuthal and elevational components of the movement of the target scene from its reference position, these signals being essentially zero, of course, when the scene does not change.

A pair of amplifiers 70 and 72, respectively, connected to the azimuth and elevation integrator circuits 54 and 56, supply amplified analog error signals to elevation and azimuth position control devices 74 and 76 (FIG. 1). The control devices 74 and 76 may include servo motors used to operate a tracker-supporting gimbal (not shown) to maintain the optical system or tracker and/or weapon where used pointed toward the selected target scene.

Connected also to the magnetic head 38 is an amplifier 77 adapted to pick up and amplify the signal waveform that corresponds to the nondelayed reference scene recorded on the memory disc 42. The output of amplifier 77 is applied to the "Exclusive OR" circuit or correlator 34 which also continuously receives a signal waveform from detector 31 corresponding to the current scene. Correlation of these waveforms produces an output expressing the continuous relationship between the stored reference scene and the current scene. The output of circuit 34 is connected to the comparator circuit 35 which is connected to gate or control the record amplifier 36 through an update control circuit 79.

In this way, the reference scene can be automatically updated when a prespecified threshold of decorrelation is reached between the current and reference scene information. The automatic updating function is modified subject to the compatibility of the update requirement with the various criteria which may be designed into the update criteria circuit 80. Thus, when the correlation output of circuit 34 falls to a predetermined level, the comparator circuit 35 delivers an update signal to the criteria circuit 80. If the criteria are compatible with an update requirement, the signal is passed through to the update control circuit 79; if not, the update command is either postponed or blocked out until a compatible update requirement exists. When the update command reaches the update control circuit 79, amplifier 36 is gated to record a new or updated current reference scene in the memory. A manual update device 78, which may include a switch, is provided to enable the operator to gate amplifier 36 and record a current scene at will so as to acquire new targets and/or update the system reference. The particular update criteria employed will depend upon the particular application, and may include for example, circuit arrangements responsive to the rate-of-change of correlation, duration of a fast changing correlation signal, oscillatory correlation output, etc. Unmodified automatic update commands to amplifier 36 will normally be generated responsive to changes in target aspect angle, range closure, etc. In general, when the current pattern changes significantly from the pattern stored in memory, and the update criteria are satisfied, a new reference scene pattern is automatically stored in memory.

The scan patterns are symmetrical in the event of no pattern displacements (no tracker error). No modulation in the correlation signal can exist at the fundamental nutation rate, so little or substantially no error offset signal occur. Also, this correlation signal can have no modulation at any odd harmonic of the nutation rate so that little or no error offsets occur even if simpler square wave demodulation of the type shown is used.

Instead of employing shutter 60 in the demodulator control or synchronization circuit 58 in FIG. 1, other means, such as a pair of semicircular slots 82 and 83, as shown in phantom in FIG. 3 may be used. If slots 82 and 83 are used, the bulbs 62 and 63 may be disposed on one side of the reticle 16, and the photo diodes 65 and 66 on the opposite side thereof. With the slots 82 and 83 displaced 90° from each other and related to the pattern of aperture in similar manner as shutter 60, the slots will operate in the same manner as shutter 60.

The tracker 10 requires only one optical channel since both the current and reference view patterns are effectively scanned and nutated by the reticle 16, and this provides a simpler and more economical construction. In the illustrated tracker 10, scanning with nutation of the field of view is readily accomplished by offsetting the geometric center of the pattern of apertures of the reticle 16 from the axis of rotation of the reticle, as previously described herein. This provides a simple and effective circular nutation of the field of view or the "direction of look" in synchronism with scanning of the scene. In some cases, other means such as optical means to nutate the image could be used to obtain nutation of the field of view. It will be apparent to those skilled in the art that various changes can be made in the illustrated embodiment. For example, it is possible to use a correlation signal, such as that at the output of correlator 32, to control the aim of a tracker without the use of the demodulators or by using other demodulator means.

As various changes could be made in the above construction without departing from the scope of the invention, it is intended that all matter contained in the above description or shown in the accompanying drawings shall be interpreted as illustrative and not in a limiting sense.

What I claim is:

1. In a motion sensing device for producing output signals responsive to the magnitude and direction of the relative movement between the sensing device and a field of view scene comprising signal producing means for producing a signal responsive to the light energy pattern of the scene, storage means for storing said signal as a reference signal, correlator means for correlating said reference signal with a current signal to produce a correlation signal having modulations indicative of said relative movement, and processing means for processing said correlation signal to produce said output signals, the improvement comprising said signal producing means comprising means for producing a signal corresponding to a predetermined nutation of the scene, and including means for storing in said storage means as a reference signal a portion of said signal corresponding to a complete nutational cycle, and further including means for applying to said correlator means a current signal and a reference signal corresponding to the current signal but time delayed with respect to the nutational cycle.

2. The motion sensing device according to claim 1 wherein said reference signals correspond to a complete circular nutation of the field of view whereby said modulations are indicative of relative movement of said field of view in two dimensions.

3. The motion sensing device according to claim 2, wherein said signal producing means includes a movable reticle having a predetermined repetitive pattern of light transmitting elements arranged symmetrically about a geometric center for scanning said scene, and light energy sensitive means responsive to the passage of energy through said reticle, said center being offset with respect to the axis of rotation of said reticle to effectively produce an upright circular nutation of said field of view.

4. The motion sensing device according to claim 1 wherein said reference means is time delayed by one-half of said nutation cycle.

5. The motion sensing device according to claim 1 wherein said processing means include means for producing a pair of orthogonally related control signals in synchronism with the circular nutation of the field of view so that said output signals correspond to orthogonal components of the relative movement between the sensing device and the scene.

6. In a motion sensing device for producing output signals responsive to the magnitude and direction of the relative movement between the sensing device and an object within a field of view scene comprising reticle means for repetitively scanning the scene, light energy sensitive means responsive to the radiant energy passing through said reticle means to produce an electrical signal corresponding to the light energy pattern of the current field of view scene, storage means for selectively storing said electrical signal, and signal correlation means having input and output means for producing an output at said output means dependent on local correlation of signals applied to said input means, the improvement comprising said reticle means further comprising means for cyclically nutating the field of view, means for supplying a signal corresponding to a nutational cycle into said storage means to provide a reference signal, means for deriving from said storage means a reference signal corresponding to a current signal but time delayed with respect to the nutational cycle, means for applying said time delayed signal and said current signal to said input means to produce a correlation signal at said output means, and means responsive to said output means including integration means for producing said output signals.

7. The motion sensing device according to claim 6, wherein said nutation of the field of view is a circular nutation.

8. The motion sensing device according to claim 6 further including means for deriving from said storage means a reference signal corresponding to said current signal and synchronous with respect to the nutational cycle, means for comparing said reference signal and said current signal to produce a comparison signal, and means responsive to a predetermined comparison signal to enter a new signal into said storage means.

9. In a correlation-type optical tracker comprising a field stop and means for focusing light energy from a selected field of view scene onto said stop, the improvement comprising means for effecting scanning of the scene and simultaneous cyclical nutation of the field of view including rotatable reticle means having a predetermined repetitive pattern of light transmitting elements, at least one repetition of the pattern of elements being offset in relation to another of said repetitions to introduce an effective nutation of the scene, circuit means including light energy responsive means adapted to receive the light energy passing through said elements and converting the same to an electrical waveform responsive to the spatial frequency content of said scene, memory means for storing a waveform representative of at least one complete scan of the scene, means for selectively entering a portion of the waveform into said memory means to provide a reference scene waveform, means for deriving from said memory means a waveform corresponding to a current waveform but time delayed therewith, correlator means for correlating said time delayed reference scene waveform and the waveform corresponding to the current scene to produce a correlation waveform, means responsive to said correlation waveform including integrator means for producing output signals, and control means for controlling the aim of said tracker in response to said integrated signals to maintain said tracker aimed substantially at said scene.

10. The tracker according to claim 9, including other correlator means, means for deriving a waveform from said memory means corresponding to said reference scene waveform, means for applying said reference scene waveform and a waveform corresponding to the current scene to said other correlator means to produce a control signal, and memory control means for controlling the entry of a waveform into said memory means in response to a predetermined value of said control signal.

11. The correlation tracker according to claim 9, wherein said pattern of elements is symmetrical about geometric center, said center being offset with respect to the axis of rotation of said reticle to effectively produce an upright circular nutation of said field of view.

12. The motion sensing device according to claim 9 including demodulator means responsive to said correlation waveform, said demodulator means including control means responsive to the nutation frequency, for deriving signals responsive to the orthogonal components of movement of the reference scene with respect to the current scene.

13. The motion sensing device according to claim 9 wherein each repetition of said pattern of elements is arranged in a semirandom order to effect scanning of the scene in other than sequential order.

14. In a correlation tracker comprising a field stop and means for focusing light energy from a selected field of view scene onto said stop, rotatable reticle means, the improvement comprising said reticle means having a predetermined pattern of apertures having symmetry with respect to a geometric center offset from the center of rotation of the reticle to provide a circular nutation of the field of view, circuit means including light energy responsive means adapted to receive the light energy passing through said apertures to produce an electrical signal responsive thereto, detector means for converting said signal to a waveform responsive to the spatial frequency content of the current scene, memory means for storing a portion of said waveform, means for entering into said memory means a portion of said waveform that corresponds to a nutational cycle, means for deriving from said memory means a portion of said waveform corresponding to a current waveform but time delayed one-half of the nutational cycle, correlator means having input and output circuits for producing an output at said output circuit dependent on local correlation between signals applied to said input circuit, means for applying said delayed waveform and said current waveform from said detector means to said input circuit to produce a correlation waveform at said output circuit, said waveform having modulations substantially corresponding to the relative movement between the scene and the tracker, and means for controlling the aim of said tracker in response to said modulated waveform to maintain the tracker substantially aimed at the scene.

15. The tracker according to claim 14 wherein said detector means includes a zero crossing detector means for converting an incident analog waveform to a binary digital waveform.

16. The tracker according to claim 15, wherein said memory means includes magnetic recording means rotatable in synchronism with said circular nutation.

17. The tracker according to claim 15 wherein said first named and said other correlator means include Exclusive-OR circuits, respectively.

18. The tracker according to claim 14, including means for updating said memory device in response to predetermined conditions including other correlator means having input and output circuits for producing an output at said output circuit dependent on local correlation between signals applied to said input circuit, means for deriving from said memory means a waveform corresponding to a current waveform and applying said derived waveform and said current waveform to said other correlator input circuit and means for controlling the entry of a new waveform into said memory means in response to a predetermined value of the output of said other correlator.

19. The tracker according to claim 14 wherein the means for controlling the aim of the tracker comprise first and second demodulator means each having an input connected to receive said correlation waveform, demodulator control means responsive to the rotation of said reticle to provide a pair of control signals phase displaced orthogonally from each other respectively for controlling said first and second demodulator means to produce a pair of error signals substantially corresponding to the orthogonal components of the relative movement between the scene and the tracker.

20. In a correlation-type optical tracker comprising a field stop, means for focusing light energy from a selected field of view scene onto said stop, scanning means for effecting scanning of the scene, circuit means including light energy responsive means adapted to receive the light energy from said scanning means and to convert the same to an analog electrical waveform responsive to the spatial frequency content of said scene, memory means for storing a reference scene waveform, means for selectively entering a portion of said electrical waveform to provide a reference scene waveform, means for deriving said reference waveform from said memory means, correlator means for producing an output dependent on correlation of signals applied to it, means for applying said reference scene waveform and an electrical waveform corresponding to the current scene to said correlator means to produce a correlation waveform having modulations corresponding to the direction and magnitude of relative movement between the tracker and the scene, and control means for controlling the aim of the tracker in response to said correlation waveform to maintain the tracker aimed substantially at said scene, the improvement comprising zero crossing means in said circuit for converting said analog electrical waveform to a digital electrical waveform, said memory storing said reference scene waveform as a digital waveform, said reference scene waveform and said current scene waveform being applied to said correlator as digital electrical waveforms.

21. The tracker according to claim 20, including other correlator means for producing an output dependent on correlation of signals applied to it, means for deriving a digital waveform from said memory means corresponding to said reference scene waveform, means for applying said reference scene digital waveform and a digital waveform corresponding to the current scene to said other correlator means to produce a control signal, and memory control means for controlling the entry of a waveform into said memory means in response to a predetermined value of said control signal.

22. The correlation tracker according to claim 20, wherein said scanning means includes rotatable reticle means having a predetermined pattern of light transmitting elements, said pattern of elements being repetitive and symmetrical about a geometric center, said center being offset with respect to the axis of rotation of said reticle to produce a circular nutation of said field of view.

23. In a motion sensing device for producing output signals responsive to the magnitude and direction of the relative movement between the sensing device and an object within the field of view scene comprising reticle means for repetitively scanning the scene, light energy sensitive means responsive to the radiant energy passing through said reticle means to produce an electrical signal corresponding to the light energy pattern of the current field of view scene, storage means for storing a reference signal corresponding to a reference scan of the field of view scene, and signal correlation means for producing an output dependent on local correlation of said current signal and said reference signal, the improvement comprising said reticle means comprising means for cyclically nutating the field of view, said means for nutating the field of view comprising a predetermined repetitive pattern of light transmitting elements, at least one repetition of the pattern of elements being offset in relation to another of said repetitions to introduce an effective nutation of the scene.

24. The motion sensing device according to claim 23 wherein each repetition of said pattern of elements is arranged in a semirandom order to effect scanning of the scene in other than sequential linear order.

25. The motion sensing device according to claim 23 wherein said pattern of elements is symmetrical about a geometric center, said center being offset with respect to the axis of rotation of said reticle to produce an effective upright circular nutation of said field of view.

26. In a correlation-type optical tracker comprising a field stop, means for focusing light energy from a selected field of view scene onto said stop, means for effecting scanning of the scene, circuit means including light energy responsive means adapted to receive the light energy from the scanning means and to convert the same to an electrical waveform responsive to the spatial frequency content of the scene, memory means for storing a reference scene waveform, means for selectively entering a portion of the waveform into said memory means to provide a reference scene waveform, means for deriving said reference waveform from said memory means, correlator means for correlating said time delayed reference scene waveform and the waveform corresponding to the current scene to produce a correlation waveform, and means responsive to said correlation waveform including integrator means for controlling the aim of said tracker in response to said integrated signals to maintain said tracker aimed substantially at said scene, the improvement comprising other correlator means for correlating a reference scene waveform and a waveform corresponding to a current scene to produce a correlation signal, means for deriving a waveform from said memory means corresponding to said reference scene waveform, means for applying said reference scene waveform and a waveform corresponding to the current scene to said other correlator means to produce a control signal, and memory control means for controlling the entry of a waveform into said memory means in response to a predetermined value of said control signal.